(No Model.)  7 Sheets—Sheet 1.

F. H. RICHARDS.
WEIGHING MACHINE.

No. 560,600.  Patented May 19, 1896.

Witnesses:
R. W. Pittman,
Fred. J. Dole.

Inventor:
F. H. Richards.

(No Model.) 7 Sheets—Sheet 3.

F. H. RICHARDS.
WEIGHING MACHINE.

No. 560,600. Patented May 19, 1896.

Witnesses:
R. W. Attman
Fred. J. Dole.

Inventor:
F. H. Richards

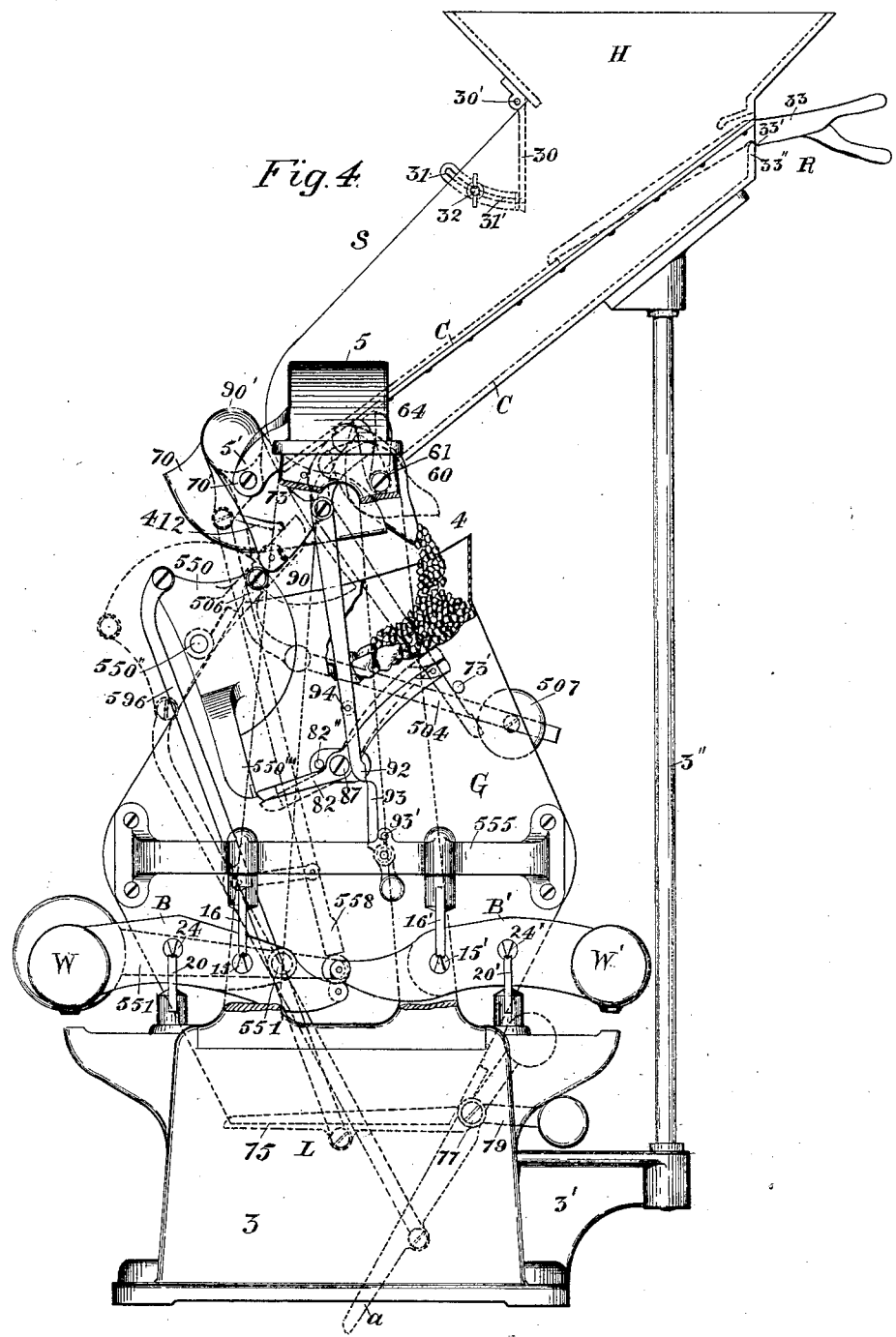

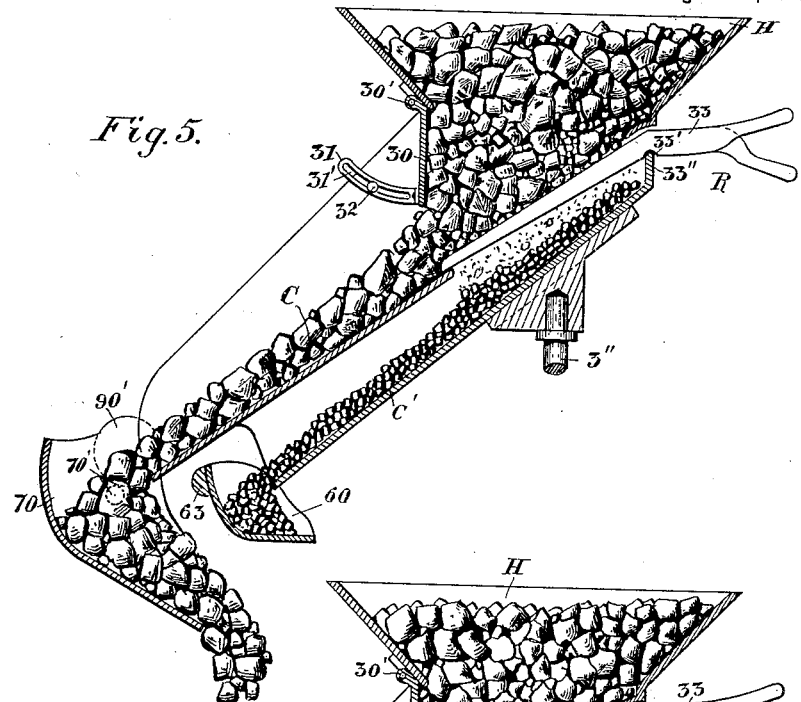
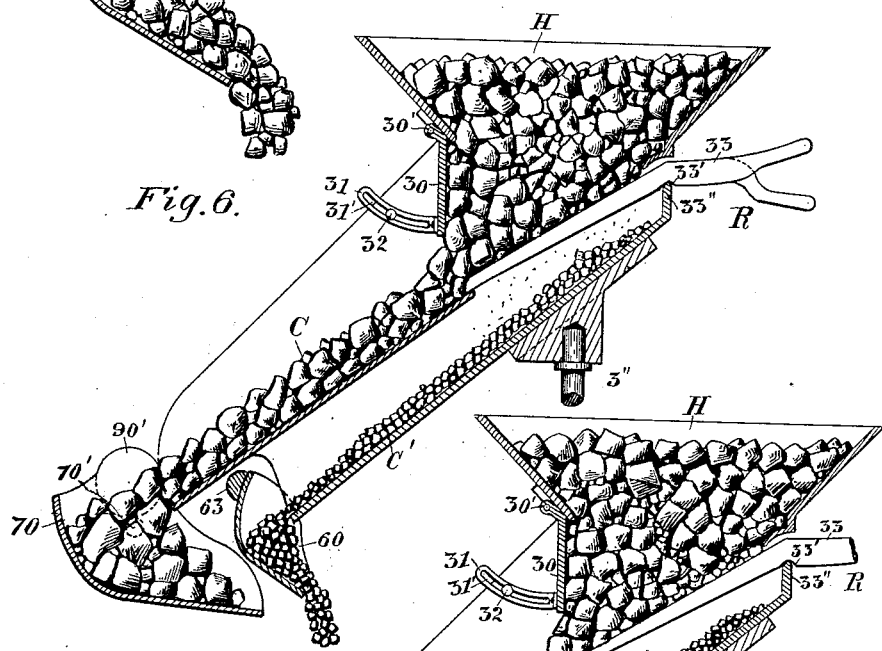
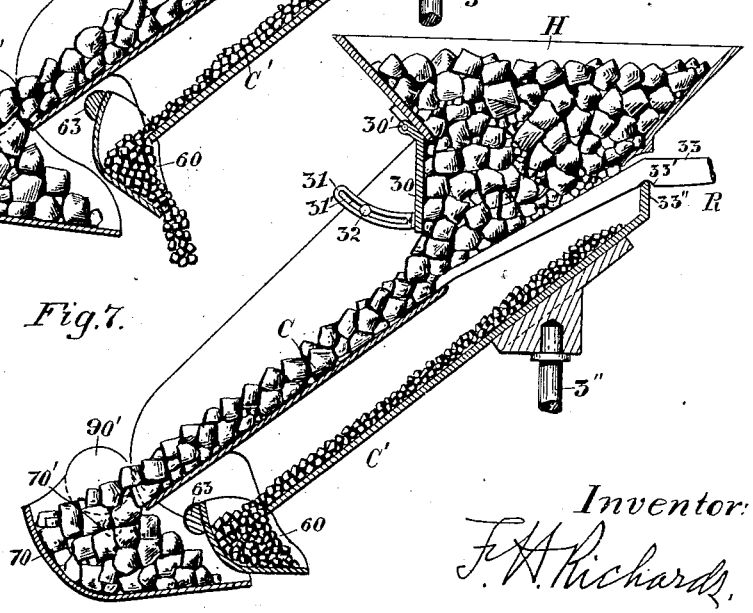

(No Model.)  F. H. RICHARDS.  7 Sheets—Sheet 6.
WEIGHING MACHINE.
No. 560,600.  Patented May 19, 1896.
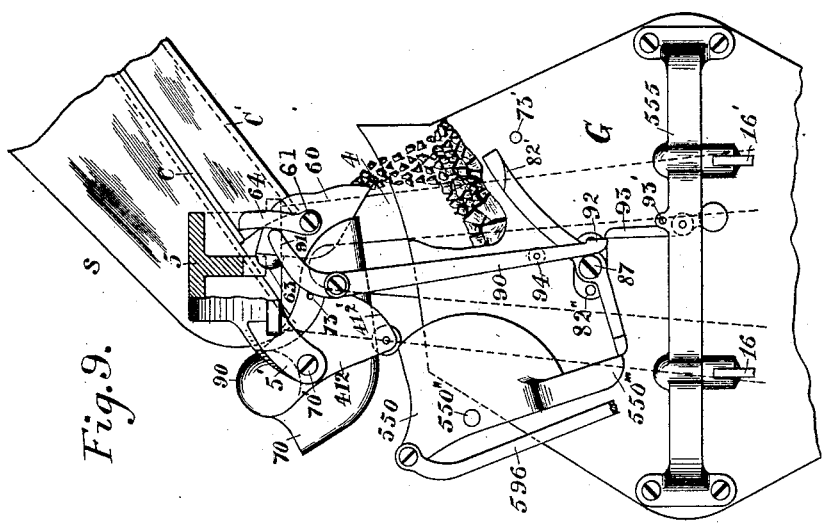
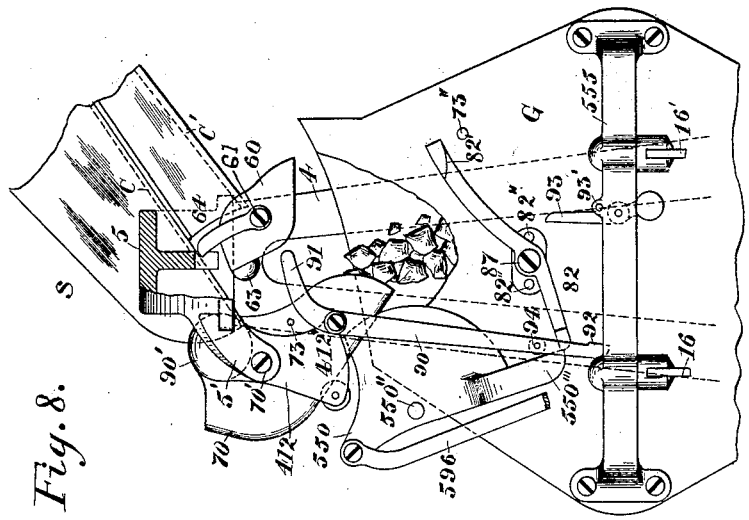
Witnesses:
R. W. Pitman
Fred. J. Dole.
Inventor:
F. H. Richards (No Model.)   F. H. RICHARDS.   7 Sheets—Sheet 7.
WEIGHING MACHINE.

No. 560,600.   Patented May 19, 1896.

Witnesses:
R. W. Pittman
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 560,600, dated May 19, 1896.

Application filed October 11, 1895. Serial No. 565,337. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for weighing coal and other lumpy and coarse materials, the object being to provide an improved weighing-machine embodying a screen or riddle for separating the supply-stream into two independent streams of material, a main stream and a drip-stream, composed, respectively, of the coarser and the finer particles of the mass, and valve mechanism embodying a pair of successively-opening stream-controlling valves, and valve-actuating mechanism therefor.

Figure 1:
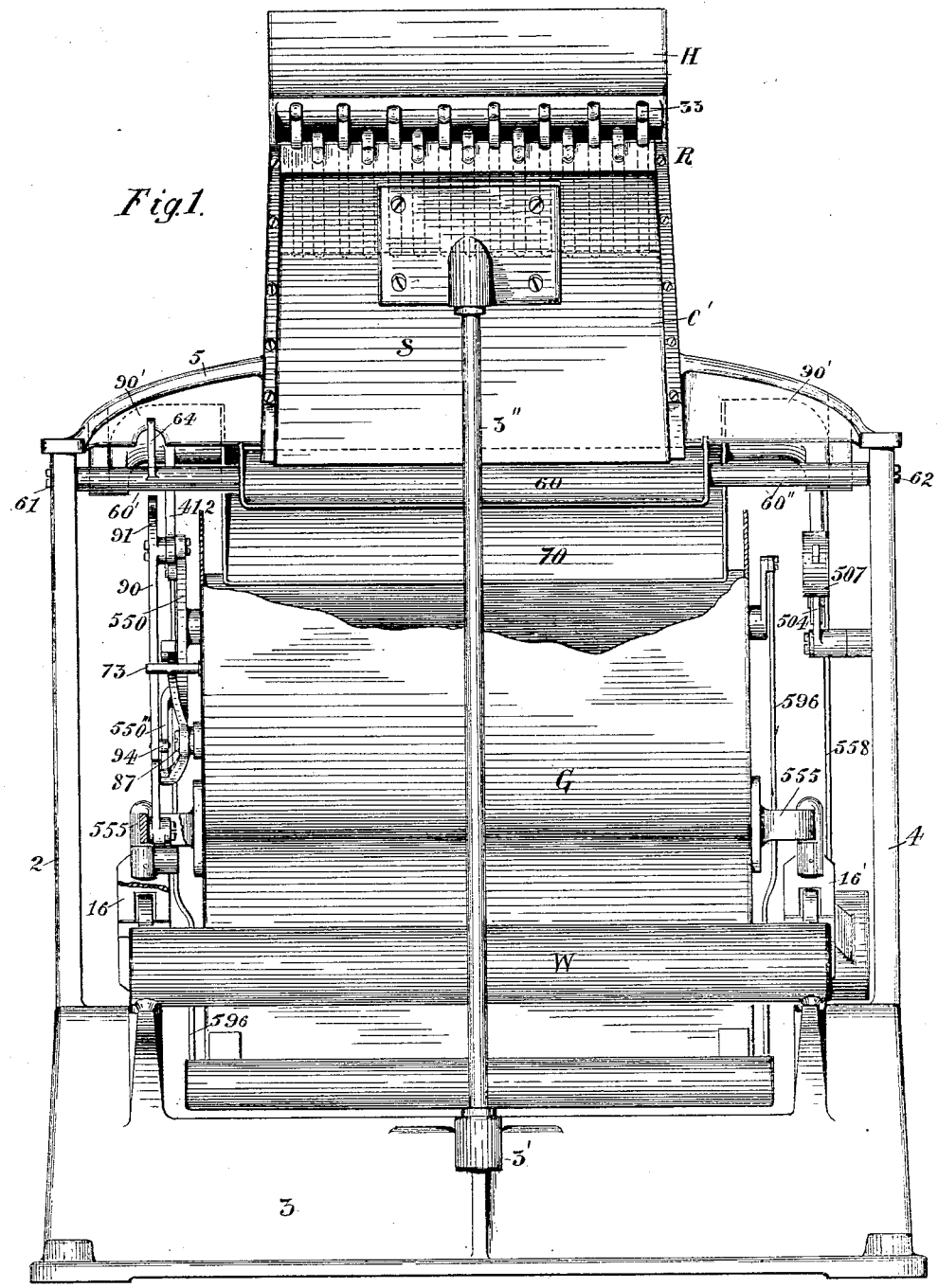
Figure 2:
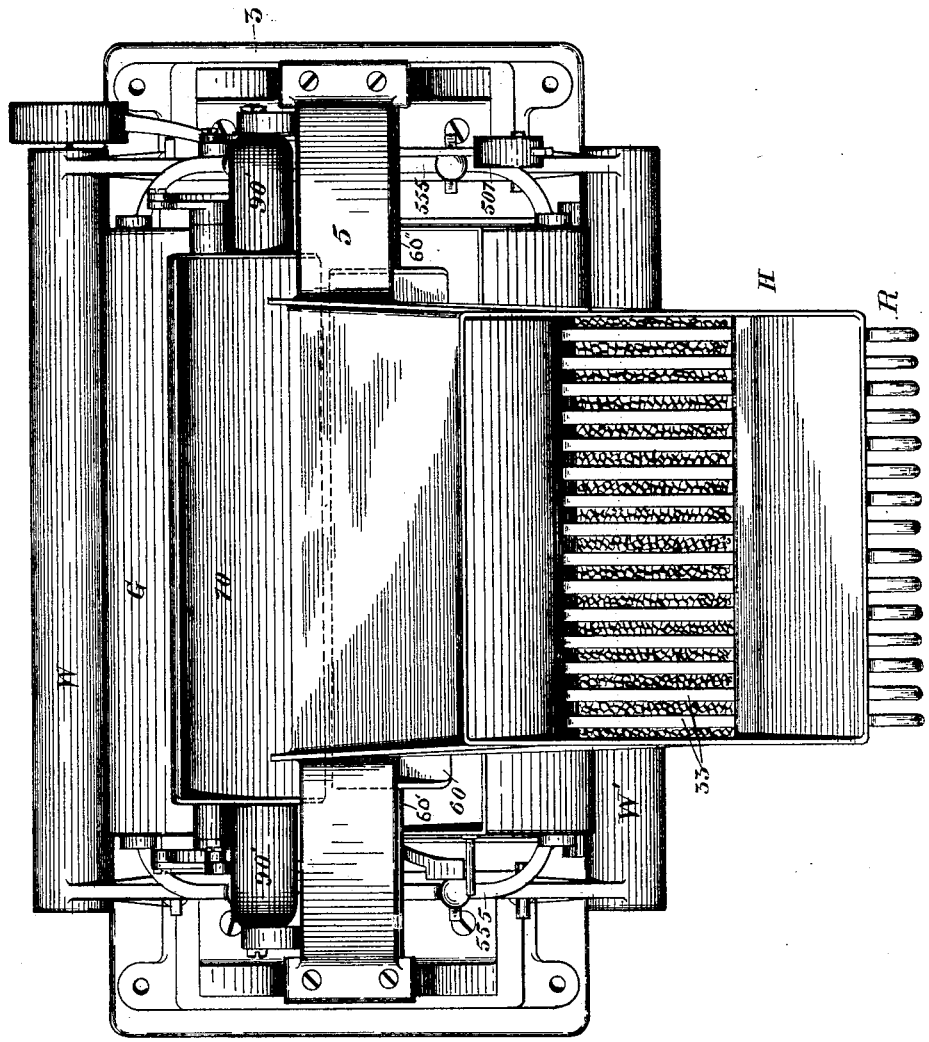
Figure 3:
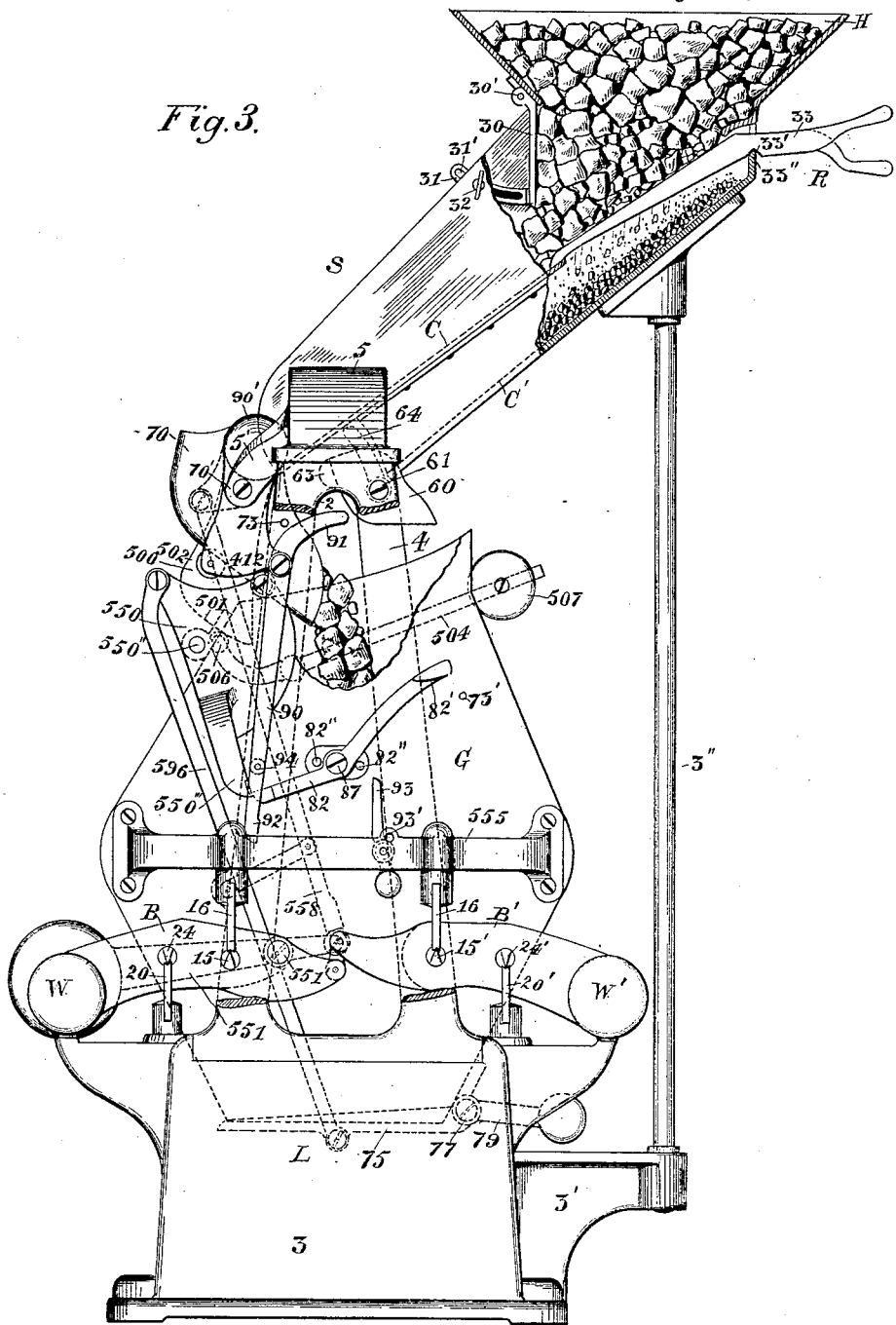

In the drawings accompanying and forming part of this application, Figure 1 is a front elevation of a weighing-machine embodying my present improvements and illustrating the machine in the normal position thereof. Fig. 2 is a plan view of the same. Fig. 3 is an end elevation, seen from the left in Fig. 1, illustrating the main valve open and the supplemental valve in the normally-closed position thereof. Fig. 4 is a similar view illustrating a succeeding step in the operation of the machine, the main valve being closed for cutting off the main stream and the supplemental valve open for permitting the flow of the drip-stream. Figs. 5, 6, and 7 are sectional details in cross-section of the supply-chute and valve mechanism and illustrate the successive positions of the main and the supplemental valves from the commencement of flow of the supply-stream and until the cut off thereof. Figs. 8, 9, and 10 are right-hand end elevations of parts of the weighing-machine and illustrating the successive positions of the valve from the commencement of flow of the main stream to the cut off of the drip-stream. Fig. 11 is a front elevation of the left-hand end of the main and the supplemental valves.

Similar characters designate like parts in all the figures of the drawings.

For convenience in illustrating the nature of the present improvements these are shown applied to the improved weighing-machine shown, described, and claimed in Letters Patent No. 548,840, granted to me October 29, 1895; but it will be obvious that said improvements may be used as well with other forms of weighing-machines.

The framework for supporting the operative parts of the weighing-machine may be of any suitable construction, and is shown in the drawings comprising two side frames or uprights 2 and 4, mounted upon a chambered supporting-base 3 and connected by a top plate 5. The base 3 is shown as carrying suitable beam-supports, such as V-shaped bearings, (four in number,) two of which are illustrated at 20 and 20', for supporting the scale-beams which carry the bucket mechanism, consisting of the bucket and its operative devices.

As a means for supporting the bucket or load-carrying receptacle (designated in a general way by G) a pair of oppositely-disposed counterweighted beams are shown at B and B', respectively, pivotally mounted on the beam-supports, as by means of pivots or knife-edges 24 and 24', which correspond in number and position with the beam-supports 20 and 20'. Each of the scale-beams B and B' comprises a pair of beam-arms joined by a combined connecting-shaft and counterpoise, the counterpoise for the scale-beam B being designated by W and that for the beam B' being designated by W'.

For the purpose of supporting the bucket G from and by the beam-arms bucket-supports 15 and 15', in the form of knife-edges, are shown carried by said beam-arms, and the bucket G, which is pivotally supported on said beam-arms, is shown provided with complementary bearing-faces corresponding in position and number with said knife-edges 15 and 15', these bearing-faces being illustrated as the V-shaped bearings 16 and 16', illustrated as carried by the hangers 555, which will be suitably secured to each end of the bucket G.

The weighing-machine will have the usual poising and counterpoising mechanisms. All that part of the beam mechanism, including the bucket, located between the knife-edges 24 and 24' constitutes the poising or bucket-poising mechanism of the machine, and all that portion of the beam mechanism located outside of said pivots constitutes the counterpoising or bucket-counterpoising mechanism of the machine.

The bucket mechanism consists of two members, one of which is shiftable relatively to the other for discharging the load, and the bucket-closer (designated in a general way by L) is shown constituting the shiftable member. The bucket-closer is shown consisting of a suitably-formed plate or closer proper, such as 75, having a counterweighted arm 79, preferably formed integral therewith, the closer being also illustrated pivoted at 77 to the lower side of the bucket and adjacent to the discharge-opening thereof.

As a means for supporting the bucket-closer an inverted toggle connection is shown in the drawings, connecting the closer and the bucket, and this toggle connection is so positioned as to be engaged by a closer-latch and held at about the angle of repose of the connection when the latch is in its operative position and the closer is shut. In the form thereof herein illustrated this toggle connection comprises some suitable rocker—such, for instance, as 550—pivoted adjacent to the upper rearward side of the bucket and having a long connecting-rod 596, pivoted to said rocker, and also to the closer, in such a manner that when the closer is shut the two pivots of said connecting-rod or toggle member will be nearly in line with, and the upper of said pivots will be above, the rocker-pivot, whereby when the rocker is engaged by the closer-latch and held in that position the closer will be supported with a minimum pressure on the latch, as practically all of the weight of the bucket contents will be carried on the pivot 550'' of the rocker. The closer-latch for locking the rocker in position when the closer is shut (designated by 82) is shown herein pivoted at 87 to the bucket G and having a detent or stop for engaging a coöperating stop 550''' on the toggle connection when the parts are in the closed position previously described. The closer-latch 82 is shown counterweighted and limited in its movement toward the stop or detent 550''' on the toggle connection by means of suitable stops, such as 82''. It will be noticed that in the embodiment of closer-latch shown this has forward of its pivot a downward movement for engaging the rocker 550, and it will be evident that said latch may be released by a proper upward thrust. The supply-stream, as is usual, is made up of two streams of material, the main stream and the drip-stream.

The present improvements contemplate, in part, the provision of means for the maintenance and supply of two independent streams of material, composed, respectively, of the coarse (which constitutes the main stream) and the fine (which constitutes the drip-stream) particles of the mass.

The base 3 of the machine is shown provided with a forwardly-projecting arm or member 3', which is shown carrying the rod 3'', which is adapted for supporting the supply apparatus, (designated in a general way by S,) and which is shown consisting of the supply-hopper H and a supply-chute communicating therewith, which in turn comprises the main-stream chute and the drip-stream chute C and C', respectively, located one above the other, and said supply-chute is supported at the forward end thereof by the top plate 5 of the machine.

The supply-hopper H is adapted for containing the mass of material to be weighed, and in practice the material will be conducted into said hopper by an elevator or other suitable mechanism. (Not shown.) The rear wall of the hopper is shown provided with an oscillatory regulating-plate 30, illustrated as hinged to said wall, as at 30', the function of which regulating-plate is to adjust or regulate the size of the discharge orifice or opening of said hopper H for different sizes of material and also to be swung outwardly in case said discharge orifice or opening becomes choked or blocked from any cause during the operation of the machine. This regulating plate or gate 30, as stated, is oscillatory, but will be normally fixed against movement by suitable means, except when the throat or discharge-orifice becomes blocked or choked with unusually large lumps of material, when the difficulty may be easily removed by loosening the holding means and simply swinging said plate outwardly. The means illustrated for maintaining said regulating plate or gate in a fixed position consists of segmental or curved plates 31, each secured thereto and each having a segmental opening 31', through which passes a set-screw 32, seated in the end walls of the supply-chute, which may be tightened or loosened, so that the regulating-blade 30 will either be maintained in its fixed position or swung or moved in either direction for increasing or decreasing the size of the discharge-orifice of the supply-hopper, which latter function is for the purpose of adapting the machine to weighing different characters of materials.

The supply-stream when it leaves the hopper H will be separated into two independent streams of material, constituting a main stream and a drip-stream and composed, respectively, of the coarser and the finer particles of the mass, and which will be directed to the chutes C and C'; and for so separating the mass, which is shown in line with the discharge-orifice of the supply-hopper, I prefer to employ the screen or riddle shown. This screen or riddle (designated in a general way by R) consists of a series of independently-operable spaced or separated members or levers 33, which will have free movement, laterally, for increasing or diminishing the distance between each other. These members 33 are shown removable, and should it be desired to increase the space between such members it will be simply necessary to remove one or more of them and to equally increase the space between the remaining members or levers. To decrease the spaces between the levers, it will be simply necessary to move those already in place and to add one or more properly-spaced levers. These levers are shown passed through an opening in the rear of the chute C' and each having a bearing-face 33', by which said levers 33 are pivotally supported on the knife-edge 33'', carried by and extending transversely of the chute C. The forward ends of these levers rest on the upper edge of the floor of the chute C, which limits their downward movement and maintains them in their operative position. If necessary at any time during the operation of the machine to prevent blocking of the material within the supply-hopper, or for any other purpose, any one or more of the series of levers may be grasped and shaken, when the difficulty will be quickly removed.

In connection with a supply-chute, valve mechanism will be employed embodying a pair of successively-opening stream-controlling valves. The supply-stream is composed of two independent streams of material, and in weighing coal, as stated, the main stream is composed of the coarser or larger particles of the mass, which will flow into the bucket until the commencement of the poising period, or until the bucket-load is nearly completed, at which time said main stream will be cut off. Immediately succeeding the cut off of the main stream the supplemental or drip valve, which is normally closed, will be instantaneously opened for releasing and permitting the flow of the drip-stream, composed of the finer or smaller particles of the mass, (which is necessary for completing the bucket-load and which had previously been confined in a storage compartment within the supply-chute,) into the nearly-loaded bucket. On the completion of the bucket-load, the bucket having further descended and reached and gone below the poising-line, the supplemental valve, which is momentarily opened and held against closing movement by suitable means, will be released, and, resuming its normal position, will cut off the drip-stream.

As a means for controlling the main stream from the main chute C, I prefer to employ the stream-controlling valve shown. This valve (designated by 70) is substantially similar to the improved valve shown, described, and claimed in Letters Patent No. 535,727, granted to me March 12, 1895. This main valve is shown pivoted at 70' between arms or brackets 5', depending from the top plate 5, and located substantially beneath the discharge edge of the main chute C, and extending beyond said forward edge sufficiently far to support the descending column or mass when said valve is closed. This main valve is also preferably balanced, so as to have, normally, no tendency either to open or close, (the balance-weight being illustrated at 90'.) As a means for actuating the main valve 70 to open the same the mechanism shown will be preferably employed, and said mechanism will be now described; and this mechanism is substantially similar to that shown, described, and claimed in Letters Patent No. 548,839, granted to me October 29, 1895, to which reference may be had. Said main valve 70 is shown provided with a connecting-rod 558, pivoted to the upper rearward portion thereof, and having the lower end of said rod in position to be engaged by a valve-opening actuator. The beam B is illustrated carrying a counterweighted lever 551, pivoted thereto at 551', and which normally forms a part of the counterpoising mechanism of the machine, but which is shiftable therefrom and onto the poising mechanism of the machine at a predetermined point in the movement of the bucket, and on the return of said lever or actuator 551 to the normal position thereof it is effective for transmitting to said main valve 70, through the connecting-rod, a thrust for opening said valve. On the descent of the bucket this rod 558 serves as a stop for limiting the closing movement of said main valve. The stop members 412 and 550, operative, respectively, with the main valve and with the closer, are shown, and these are provided with properly-positioned stops for reciprocally limiting the valve and closer movements. As a means for closing said main valve 70 I prefer to employ the valve-closing mechanism described and claimed in Letters Patent No. 548,843, granted to me October 29, 1895, to which reference may be had, and said mechanism will now be described. A lever is shown at 504, pivoted to the side frame 4 and having at its forward end an antifriction-roller 506, adapted to engage the cam-surfaces of a valve-closing cam 500 to oscillate said cam, which is operative with the valve, and hence the valve itself, in a direction for closing the same. The lever is shown weighted at 507 at its forward end. The valve-closing cam is illustrated having two cam-faces, a reducing cam-face 501 and a cut-off cam-face 502, the latter being of relatively greater efficiency than the former, so that when the roller 506 leaves the reducing cam-face 501 it will be effective to instantly close the valve 70 by riding over the cut-off cam-face 502, which, as stated, is of relatively greater efficiency than the reducing cam-face 501.

The drip-chute C' is illustrated as being in the nature of a storage compartment, into which the mass of fine particles flow and are confined after being separated from the supply-stream, and the supplemental valve is shown constituting a means for maintaining this mass within said compartment and for releasing the same at a predetermined point in the operation of the machine.

The supplemental or drip valve is illustrated at 60, located in advance of the main valve 70, and supported for movement independently of the main valve. This supplemental valve will be normally maintained in a closed position. The supplemental valve is pivotally supported for oscillatory movement within the framework of the machine, and will, like the main valve 70, be adapted for supporting, when closed, the descending drip-stream or confined mass within the storage compartment of the supply-chute. The end walls of the supplemental valve 60 are illustrated provided with the laterally-projecting members 60' and 60", constituting a valve-supporting shaft, in the outer extremities of which are seated the pivot-screws 61 and 62, carried by the framework of the machine. The means illustrated for maintaining the supplemental valve in its normally-closed position is a counterweight 63.

For opening the normally-closed supplemental valve some suitable means or valve-actuating mechanism will be employed, and an actuator, operated by and from the power of the closing main valve, is illustrated for this purpose.

The supplemental-valve shaft is shown provided with a valve-opening cam 64, operative with said valve and having a cam-face of proper curvature, which is adapted to be engaged by a supplemental-valve-opening actuator. As hereinbefore stated, this actuator will be operated by and from the power of the closing main valve and succeeding the cut off of the main stream by the latter. The main-valve stop member 412, which is operative with said main valve, is shown provided at a point near the extremity of its cam-face 412' with a pivotally-supported and loosely-suspended lever or member 90, provided with a forwardly-curved arm 91 above the pivot thereof, which constitutes a supplemental-valve-opening actuator. The lever 90, as stated, is loosely suspended; but at a predetermined point in the closing movement of the main valve and the descent of the bucket the loosely-suspended member 90, and thereby the actuator 91, is adapted to be held against movement by suitable means, and when so held said actuator will be effective to engage and ride over the cam-face of the supplemental-valve-opening cam 64 for oscillating said cam, and thereby opening or oscillating the supplemental valve for releasing the drip-stream which had theretofore been confined within the storage chamber or compartment of the supply-chute by said normally-closed supplemental valve.

The lever 90, and hence the actuator 91, as hereinbefore stated, is loosely suspended from the main-valve stop member 412; but at a predetermined point in the closing movement of the main valve said actuator will be engaged by suitable means for holding the same against rearward movement. The means illustrated for this purpose is a fixed stop 73, carried by the main valve 70. It will be assumed that said main valve has cut off the main stream, which, as hereinbefore stated, is composed of the large lumps which have been separated from the supply-stream, and that the actuator 91, which is operative with said main valve, has been carried to its effective position. (See Fig. 9.) The cam surface or face of the supplemental-valve-opening cam 64 is located in the path of movement of the actuator 91, and at the proper point in the operation of the machine—that is, succeeding the cut off of the main stream—the stop 73, carried by the main valve, will abut against the actuator 91 and effectually prevent the rearward movement of said actuator. The actuator having engaged the cam-surface of the cam 64, it will be apparent that on the continued closing movement of said main valve 70 said actuator—the movement of which in a rearward direction, as stated, is limited by the stop 73—will be operative for tipping or tilting the supplemental valve 60 for releasing the drip-stream, composed of the fine or small particles in the mass, and these will flow into the bucket for completing the load therein, at which time the supplemental valve will be released for cutting off the drip-stream. Means are provided for controlling the duration of flow of the drip-stream into the bucket, and the lever 90, which carries the supplemental-valve-opening actuator 91, will also have operative therewith a detent in position to be engaged by a coöperating detent carried by the poising mechanism of the machine. Said lever-detent is illustrated at 92, provided at the lower extremity thereof, and the coöperating detent for engaging said detent 92 is illustrated at 93 as a by-pass carried by the bucket G. This by-pass is shown oscillatory on the bucket G and as having a counterweight below its pivot, limited in its movement away from said detent 92 by a fixed stop 93', carried by the bucket G. On the return movement of the lever 90—that is, on the opening movement of the main valve—said lever 90 will swing the by-pass 93 about its pivot and will be thereby permitted to resume its normal position, as shown by Fig. 3.

When the supplemental-valve-opening cam-surface is engaged by the actuator 91, the effect, as hereinbefore stated, owing to the resistance interposed to the rearward movement of said actuator 91 by the fixed stop 73, carried by the main valve, on the further closing movement of the main valve, is to tip or oscillate said supplemental valve for releasing the drip-stream; and this operation will occur, as also stated, at the commencement of the poising period and succeeding the cut off of the main stream. It will be remembered that the supplemental valve 60 has been described as provided with a counterweight as a means for maintaining the same in the normally-closed position. This counterweight is of relatively considerable weight, and, being at the rear of the pivot of the supplemental valve, is effective, when the actuator is on the cam-face of the cam 64, to press or force the detent 92 into positive engagement with the by-pass 93, carried by the bucket G, whereby so long as this engagement of the detents continues the supplemental valve will be held against closing movement. The length of the upper arm of the by-pass relatively to the lever 90 is such that when the bucket reaches and goes below the poising-line these detents will be disengaged, whereby the counterweight may then be effective for closing the supplemental valve to cut off the drip-stream.

It will be remembered that a latch has been described for normally holding the shiftable member of the bucket mechanism (herein illustrated as the closer L) against bucket-discharge movement, and that said latch may also be released by a proper thrust (herein illustrated as an upward thrust) exerted on said lever forward of the pivot thereof, whereby when said latch is so released the closer will also be released for discharging the bucket-load.

The closer-latch 82 is shown provided with a curved stop or cam face 82', of proper curvature, interposed in the path of movement of a suitable releaser device, and it will be apparent that when said face 82' is engaged the latch 82 will be tripped for releasing the closer.

The lever 90 is illustrated provided with an antifriction-roll constituting a releaser device or actuator 94, and when said lever is released, in the manner hereinbefore described, the counterweight of the supplemental valve, pressing against the actuator 91, will move or carry the lever 90 below its pivot forwardly, so that during this continued forward movement of the lever 90 the antifriction-roll 94 thereof will engage and ride over the curved or cam face 82' for tripping the latch 82 by the power of the closing supplemental valve 60. A suitable stop, as 73', carried by the bucket G, is also employed for limiting such forward movement of the lever.

From the preceding description it will be evident that for opening the supplemental valve and for releasing the shiftable member of the bucket mechanism a member in the nature of a combined supplemental-valve-opening actuator and a releaser device is provided for successively opening the supplemental valve and for releasing the shiftable member of the bucket mechanism.

Briefly described, the operation of a weighing-machine embodying the present improvements is as follows: Fig. 3 represents the position of the machine at the commencement of operation, the bucket being empty and the main valve open for permitting a flow of the main stream into the bucket. When a sufficient portion of the main stream, composed of the larger lumps, has been received by the bucket, this tends to descend. On the descent of the bucket the valve-opening actuator 551, falling slowly from under the connecting-rod 558, permits a closing movement of the main valve 70 by the valve-closing-actuator antifriction-roll 506 riding over the reducing cam-face 501 of the valve-closing cam. At the commencement of the poising period the roll 506 of the valve-closing actuator will be approximately at the juncture of the reducing and cut-off cam-faces of said valve-closing cam, thereby bringing the main valve to the stream-cut-off position thereof. The main stream having been cut off, the actuator 91 (see Fig. 9) will engage and ride over the cam-face of the supplemental-valve-opening cam 64 in the manner described, thereby opening the supplemental valve for releasing the drip-stream, composed of the fine particles of the mass. Simultaneous with this action the detents 92 and 93 will be in engagement, thereby holding the supplemental valve against further closing movement, Fig. 4. When the bucket reaches and goes just below the poising-line, the detent 93 thereon will release the detent 92 of the lever 90, permitting an immediate closure of the supplemental valve 60 by its counterweight. On the closure of the supplemental valve the counterweight thereon, reacting on the actuator 91 through the cam 64, will move said lever forwardly below its pivot. The lever 90, it will be understood, carries the releaser device 94, and on its further movement the releaser device 94, which is illustrated in the form of an antifriction-roller, will engage and ride over the cam or stop face 82' of the latch 82, tripping said lever, which operation releases the closer for discharging the bucket-load. (See dotted lines a, Fig. 4.)

Having thus described my invention, I claim—

1. In a weighing-machine, the combination with a duplex supply-chute for supplying independent streams of material of different grades, of a pair of valves therefor; and mechanism for successively opening said valves.

2. In a weighing-machine, the combination with a duplex supply-chute for supplying independent streams of material of different grades, of a pair of valves therefor, one of which is located in advance of the other; and mechanism for successively opening said valves.

3. In a weighing-machine, the combination with a duplex supply-chute for supplying independent streams of material of different grades, of a pair of valves therefor, one of which is normally closed; and mechanism for successively opening said valves.

4. In a weighing-machine, the combination with a duplex supply-chute for supplying independent streams of material of different grades, of a pair of valves therefor; and mechanism for successively opening, and for successively closing said valves.

5. In a weighing-machine, the combination with beam mechanism, and with a bucket supported thereon for ascending and descending movements, of a main-stream chute; a storage compartment separate therefrom for confining a mass of material; and means for releasing said confined mass of material at a predetermined point in the descent of the bucket.

6. In a weighing-machine, the combination with beam mechanism, and with a bucket supported thereon for ascending and descending movements; of a supply-chute for supplying main and drip streams of material to the bucket; a valve for controlling said main stream; a second valve for controlling said drip-stream flowing from said supply-chute, said second-mentioned valve having a counterweight for maintaining the same normally closed; and valve-actuating mechanism for closing said first-mentioned valve, and for opening said second-mentioned valve at a predetermined point in the descent of the bucket, substantially as specified.

7. In a weighing-machine, the combination with a supply-chute; of a screen for separating the supply-stream into two separate streams of material, composed, respectively, of the coarser and the finer particles in the mass; and valve mechanism for controlling said streams of material, substantially as specified.

8. In a weighing-machine, the combination with a supply-chute; of a screen for separating the supply-stream into two independent streams of material, composed, respectively, of the coarser and the finer particles of the mass, said screen consisting of a series of independently-operable members; and means for cutting off said streams of material, substantially as specified.

9. In a weighing-machine, the combination with a supply-chute; of a screen for separating the supply-stream into two independent streams of material, composed, respectively, of the coarse and fine particles of the mass, said screen consisting of a series of removable levers; and means for cutting off said streams of material, substantially as specified.

10. In a weighing-machine, the combination with a supply-chute; of a screen for separating the supply-stream into two independent streams of material, composed, respectively, of the coarser and the finer particles of the mass, said screen consisting of a series of pivotally-supported levers; and means for cutting off said streams of material, substantially as specified.

11. In a weighing-machine, the combination with a duplex supply-chute, of a pair of valves, therefor and an actuator operative with one of said valves for actuating the other valve.

12. In a weighing-machine, the combination with a duplex supply-chute embodying main and drip stream chutes for supplying, respectively, different grades of material, of a supply-hopper communicating with each of said chutes; and means for regulating the size of the discharge-orifice of said hopper.

13. In a weighing-machine, the combination with a supply-chute; of a pair of stream-controlling valves therefor; valve-actuating mechanism for closing said valves, and having one of said valves opened by the power of the other at a predetermined point in the closing movement of the latter, substantially as specified.

14. In a weighing-machine, the combination with beam mechanism, and a bucket supported thereon for ascending and descending movements; of means for maintaining and supplying to the bucket two independent streams of material; a pair of successively-opening stream-controlling valves for controlling said streams of material; and valve-actuating mechanism for said valves, substantially as specified.

15. In a weighing-machine, the combination with a supply-chute, of a pair of valves therefor; a cam operative with one of said valves; and an actuator carried by the other valve for engaging the cam-surface of said cam, to thereby actuate said first-mentioned valve.

16. In a weighing-machine, the combination with bucket mechanism having two members, one of which is shiftable relatively to the other for discharging the bucket-load; of a supply-chute; a pair of stream-controlling valves for said chute; valve-actuating mechanism for opening and closing the main valve, and for closing the supplemental valve; and a combined supplemental-valve-opening actuator and releaser device operative for successively actuating the supplemental valve to open the same, and for releasing the shiftable member of the bucket mechanism for discharging the bucket-load, substantially as specified.

17. In a weighing-machine, the combination with a supply-chute; of a pair of valves, each for controlling a stream of material flowing from said supply-chute; a loosely-supported actuator operative with one of said valves for opening the other; and means for holding said actuator against movement at a predetermined point in the closing movement of one of said valves, whereby when said actuator is so held it will be effective for opening the other of said valves, substantially as specified.

18. In a weighing-machine having a poising mechanism, and having a bucket mechanism forming part of said poising mechanism, said bucket mechanism consisting of two members, one of which is shiftable relatively to the other for discharging the bucket-load; the combination with a supply-chute; of a pair of valves, each for controlling a stream of material flowing from said supply-chute; a loosely-supported lever operative with one of said valves, said lever having a valve-opening actuator; means for holding said lever against movement at a predetermined point in the closing movement of one of said valves, whereby said actuator may be effective for opening the other of said valves; and a stop carried by the poising mechanism of the machine for engaging said lever at a predetermined point in the descent of the bucket, and for releasing the same on the further descent of the bucket, whereby the supplemental valve may be closed by its valve-closing actuator, substantially as specified.

19. In a weighing-machine, the combination with a bucket mechanism embodying two members, one of which is shiftable relatively to the other for discharging the bucket-load; of a pivotally-supported latch normally holding said shiftable member against movement, said latch having a curved stop-face forward of the pivot thereof; and a releaser device operative for engaging said curved face to thereby trip the latch, whereby the shiftable member of the bucket mechanism may be released, substantially as specified.

20. In a weighing-machine, the combination with a bucket, and with a supply-chute; of a pair of stream-controlling valves for said chute; means for closing said valves, and for opening one of said valves; and a loosely-suspended actuator operative with one of said valves, said valve having a stop to engage the actuator and hold the same against movement at a predetermined point, whereby said actuator will be operative for opening the other of said valves, substantially as specified.

21. In a weighing-machine, the combination with a supply-chute, of a pair of valves therefor; a loosely-suspended actuator carried by one of said valves; and means for holding said actuator against movement, whereby it will be effective for opening the other of said valves.

22. In a weighing-machine, the combination with a bucket mechanism having two members, one of which is shiftable relatively to the other for discharging the load; of a pair of stream-controlling valves; a latch holding said shiftable member against movement; and a releaser device operative with one of said valves for imparting an upward thrust to said latch for tripping the same, to thereby release the shiftable member of the bucket mechanism, substantially as specified.

23. In a weighing-machine, the combination with a bucket mechanism having two members, one of which is shiftable relatively to the other for discharging the load; of a pair of stream-controlling valves; a loosely-suspended member operative with one of said valves; means for holding said member against movement, whereby said member will be operative for opening the other of said valves; and a detent carried by the poising mechanism and adapted for engaging said member, to thereby hold said last-mentioned valve against movement, and for disengaging the same at a predetermined point in the descent of the bucket to thereby permit a closure of said valve, substantially as specified.

24. In a weighing-machine, the combination with a bucket mechanism embodying two members, one of which is shiftable relatively to the other for discharging the bucket-load; of a latch normally holding said shiftable member against movement; a pair of stream-controlling valves; a loosely-suspended member operative with one of said valves; means for holding said member against movement, whereby said member will be operative for opening the other of said valves, and having said last-mentioned valve, when said member is released, operative for imparting a continued movement to said member, during which movement said member will release the latch, whereby the shiftable member of the bucket mechanism will also be released for discharging the bucket-load, substantially as specified.

25. In a weighing-machine, the combination with beam mechanism, and with a bucket supported thereon for ascending and descending movements, of two separate chutes; a supply-hopper adapted for containing a mass of material; a screen located below, and in line with, the discharge-orifice of said supply-hopper and operating to separate the mass into two streams of material composed, respectively, of coarse and fine particles to be directed to one of each of said chutes and thereby to the bucket; and means for cutting off said streams during the descending movement of the bucket.

26. In a weighing-machine, the combination with a bucket mechanism embodying two members, one of which is shiftable relatively to the other for discharging the bucket-load; of a latch normally holding said shiftable member against movement; a pair of valves; a loosely-suspended member operative with one of said valves; a releaser device carried by said member; and means carried by the poising mechanism for engaging said member at a predetermined point in the descent of the bucket, and for also releasing the same on the further descent of the bucket, whereby when said member is so released, the releaser device thereon will be effective for tripping said latch, whereby the shiftable member of the bucket mechanism will be released for discharging the bucket-load, substantially as specified.

FRANCIS H. RICHARDS.

Witnesses:
FRED. J. DOLE,
S. W. POTTS.